(12) United States Patent
Burroughs et al.

(10) Patent No.: US 6,341,289 B1
(45) Date of Patent: Jan. 22, 2002

(54) OBJECT IDENTITY AND PARTITIONING FOR USER DEFINED EXTENTS

(75) Inventors: Tracy Kim Burroughs, Byron; Wilson Douglas Lee; Susan Carol Luebbe, both of Rochester, all of MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/306,518

(22) Filed: May 6, 1999

(51) Int. Cl.[7] .............................. G06F 17/00; G06F 7/00
(52) U.S. Cl. ...................................................... 707/104
(58) Field of Search ................. 707/4, 103, 6, 707/100–104

(56) References Cited

U.S. PATENT DOCUMENTS

| | | | | |
|---|---|---|---|---|
| 5,291,583 A | * | 3/1994 | Bapat .......................... | 395/500 |
| 5,426,780 A | * | 6/1995 | Gerull et al. ................ | 395/600 |
| 5,499,371 A | * | 3/1996 | Henninger et al. .......... | 395/700 |
| 5,542,078 A | * | 7/1996 | Martel et al. ................ | 395/600 |
| 5,596,746 A | * | 1/1997 | Shen et al. ................... | 395/612 |
| 5,627,979 A | * | 5/1997 | Chang et al. ................ | 395/335 |
| 5,694,598 A | * | 12/1997 | Durand et al. ............... | 395/614 |
| 5,797,137 A | * | 8/1998 | Golshani et al. ................ | 707/4 |
| 5,864,843 A | * | 1/1999 | Carino, Jr. et al. .............. | 707/4 |
| 5,870,746 A | * | 2/1999 | Knutson et al. ............. | 707/101 |
| 5,872,973 A | * | 2/1999 | Mitchell et al. ............. | 395/685 |
| 5,873,093 A | * | 2/1999 | Williamson et al. ........ | 707/103 |
| 5,878,411 A | * | 3/1999 | Burroughs et al. .............. | 707/4 |
| 5,956,730 A | * | 9/1999 | Burroughs et al. ......... | 707/104 |
| 6,061,515 A | * | 5/2000 | Chang et al. ................ | 395/702 |
| 6,076,090 A | * | 6/2000 | Burroughs et al. ......... | 707/102 |
| 6,122,641 A | * | 9/2000 | Williamson et al. ........ | 707/103 |
| 6,141,660 A | * | 10/2000 | Bach et al. .................. | 707/103 |
| 6,163,776 A | * | 12/2000 | Periwal .......................... | 707/4 |
| 6,173,439 B1 | * | 1/2001 | Carlson et al. ................ | 717/1 |

OTHER PUBLICATIONS

Microsoft Access 97—Concepts and Basic Uses, Dec. 12, 1997, Future Enterprises Inc., pp. 65–66.*

* cited by examiner

Primary Examiner—John Breene
Assistant Examiner—Linh M Pham
(74) Attorney, Agent, or Firm—Schmeiser, Olsen & Watts; S. Jared Pitts (57) ABSTRACT

The preferred embodiment of the present invention provides a system and method is provided that allows transparent and flexible partitioning of created objects in the context of schema mapping. The preferred schema mapper uses partition key values to facilitate partitioning of the created objects. The partition key value for an object determines what partition that object belongs in. To facilitate the most flexible schema mapping and partitioning, the partition key value for an object can be defined by the developer to be an attribute of an owning object, a primary key field of an owning object, or constant defined for its class. When new owned objects are created the partition key values are retrieved from their specified location in the owning object to determine the partition in which the new owned object belongs. In the preferred embodiment the developer also specifies a corresponding column of fields in the owned objects table to store the partitioning key values. Preferably, the partitioning key values are stored as a subset of the primary key field for the owned object. Because the primary key field is used to uniquely identify the corresponding object, the partition information in the partition key value partially determines the unique identifier of the owned object.

60 Claims, 8 Drawing Sheets

TABLES

Company

| CompCode | CompName |
|---|---|
| 10 | BigBlue |
| 30 | BigRed |

Employee

| SerialNumber | LastName | FirstName |
|---|---|---|
| 42370 | Black | Joe |
| 32143 | White | Sue |
| 24590 | Brown | Steve |
| 72611 | Green | Bart |

Supplies

| PartNum | PartName |
|---|---|
| 940 | Stapler |
| 1208 | Hammock |
| 1019 | Computer |
| 760 | Pager |

OBJECTS

Company ivCompCode
ivCompName

Employee ivSerialNumber
ivLastName
ivFirstName

Supplies ivPartNumber
ivPartName

```
CLASS com.ibm.sf.gf.CompanyImpl_patent
DFTTABLE ibmsf.CompanyImpl_patent
PRIMARYKEY com.ibm.sf.gf.DCompanyPKImpl
PRIMARY_KEYFIELD ivCompCode String FOREIGNPARTITIONKEY
   ivCompCode
COLUMN compcode CHAR(10) UNICODE NOTNULL
END_PRIMARYKEY
PARTITIONKEY *PARTITIONID
PARTITIONKEY_FIELD *PARTITIONID COLUMN PartitionID
   BINARY(16)
END_PARTITIONKEY
FIELD com.ibm.sf.gf.CompanyImpl_patent.ivCompanyCode String
   COLUMN compcode1
   CHAR(10) UNICODE
FIELD com.ibm.sf.gf.CompanyImp1_patent.ivCompanyName String
   COLUMN compname
   VARCHAR(128) UNICODE
END_CLASS
```

FIG. 5

```
CLASS com.ibm.sf.gf.EmployeeImpl_patent
DFTTABLE ibmsf.EmployeeImpl_patent
PRIMARYKEY com.ibm.sf.gf.DEmployeePKImpl
PRIMARY_KEYFIELD ivCompCode String FOREIGNPARTITIONKEY
  ivCompCode
COLUMN compcode CHAR(10) UNICODE NOTNULL
PRIMARY_KEYFIELD ivSerialNum int FOREIGNPARTITIONKEY ivSerialNum
COLUMN serial_num INTEGER NOTNULL
END_PRIMARYKEY
PARTITIONKEY *USERDEFINED
PARTITIONKEY_FIELD ivCompCode String FOREIGNPARTITIONKEY
ivcompcode PRIMARY_KEYFIELD_REFERENCE ivCompcode
END_PARTITIONKEY
FIELD com.ibM.sf.gf.EmployeeImpl_patent.ivSerialNum int COLUMN serialnum INTEGER
FIELD com.ibm.sf.gf.EmployeeImpl_patent.ivLastName String COLUMN last_name
VARCHAR(128) UNICODE
FIELD com.ibm.sf.gf.EmployeeImpl_patent.ivFirstname String COLUMN first_name
VARCHAR(128) UNICODE
END_CLASS
```

FIG. 6

```
CLASS com.ibm.sf.gf.SuppliesImpl_patent
DHTABLE ibmsf.SuppliesImpi_patent
PRIMARYKEY com.ibm.sf.gf.DSuppliesPKImpl
PRIMARY_KEYFIELD ivCompCode String COLUMN compcode CHAR(10) UNICODE NOTNULL
PRIMARY_KEYFIELD ivSerialNum int COLUMN serial_num INTEGER NOTNULL
PRIMARY_KEYHELD ivPartNum int COLUMN part_num INTEGER NOTNULL
END_PRIMARYKEY
PARTITION KEY *USERDEFINED
PARTITIONKEY_FIELD ivCompCode String PRIMARY_KEFIELD_REFERENCE ivCompanyCode
PARTITIONKEY_FIELD ivSerialNum int PRIMARY_KEYFIELD_REFERENCE ivSerialNum
END_PARTITIONKEY
FIELD com.ibm.sf.gf.SuppliesImpl_patent.ivPartNum int COLUMN partnum INTEGER
FIELD com.ibm.sf.gf.SuppliesImpl_patent.ivPartName String COLUMN part_name VARCHAR( 128) UNICODE
END_CLASS
```

OBJECT IDENTITY AND PARTITIONING FOR USER DEFINED EXTENTS

RELATED APPLICATIONS

This application is related to the following U.S. patent applications: "LEGACY SUBCLASSING", Ser. No. 08/912,020, filed Aug. 15, 1997; "SCHEMA MAPPING TO A LEGACY TABLE WITH PRIMARY AND FOREIGN KEY SUPPORT", Ser. No. 08/978,656, filed Mar. 16, 1997, which are incorporated herein by reference.

BACKGROUND OF THE INVENTION

1. Technical Field

The present invention relates in general to the object oriented computing. More specifically, the present invention relates to the fields of object identity and partitioning, and mapping between the schema of an object oriented application program and the schema of a relational database.

2. Background Art

The development of the EDVAC computer system of 1948 is often cited as the beginning of the computer era. Since that time computers have become indispensable in many fields of human endeavor including engineering design, machine and process control, and information storage and access. In the early days of computers, companies such as banks, industry, and the government would purchase a single computer which satisfied their needs, but by the early 1950's many companies had multiple computers and the need to move data from one computer to another became apparent. At this time computer networks began being developed to allow computers to work together.

Computer networks are capable of performing jobs that no single computer could perform and they allow low cost personal computer systems to connect to larger systems to perform tasks that such low cost systems could not perform alone. In order for computer systems to cooperate in a network to perform some complex job, software must be developed which efficiently delegates parts of the chore or tasks to different computers in the network. One of the recent advances in the field of software development has been the emergence of object oriented programming technology.

The goal of using object-oriented programming is to create small, reusable sections of program code known as objects that can be quickly and easily combined and re-used to create new programs. This is similar to the idea of using the same set of building blocks again and again to create many different structures. The modular and reusable aspects of objects typically speeds development of new programs, thereby reducing the costs associated with the development cycle. In addition, by creating and re-using a group of well-tested objects, a more stable, uniform, and consistent approach to developing new computer programs can be achieved.

Using the unique features of an object oriented language, a programmer can write code to define software objects that model something in the real world. The software object may model the attributes or characteristics of the real-world object, and it many cases, may also model its behavior. For example, a programmer whose task it is to create an employee database program can create an object that models an employee and have certain attributes of a real employee, such as a name, an address, an employee number, and so forth. Exploiting the capabilities of object-oriented programming, a programmer could use the employee object in a manner that roughly corresponds to the way one would interact with a real employee. For example, the programmer could define the employee object to provide its address when the object is asked for that address.

Object oriented databases (OODBs) have been developed that are specially designed to facilitate storage and retrieval of objects. Objects that are stored in a data store are known as persistent objects because they "persist" after the program that created them has ceased executing.

Although object-oriented programming offers significant improvements over other programming types, program development still requires significant amounts of time and effort, especially if no preexisting objects are available as a starting point. Consequently, one approach has been to provide a program developer with a set of pre-defined, interconnected classes that create a set of objects. Such pre-defined classes and libraries are typically called object frameworks. Frameworks essentially provide a prefabricated structure for a working program by defining certain classes, class relationships, and methods that a programmer may easily use by appropriate subclassing to generate a new object-oriented program.

While object-oriented programming and the use of frameworks has greatly simplified the task of creating useful and efficient computer programs, some difficulties remain. One significant difficultly is in establishing effective integration between object-oriented programs and legacy or preexisting computer systems. As an example, integrating object-oriented programs with databases used to store large quantities of data.

A database is a structure in which a computer system may store a large quantity of data organized in a manner that facilitates efficient storage, search and retrieval. The most prevalent database model used today is known as a relationship database. In a relational database the data are organized in tables. Each data element is indexed by its row and column in the table. Each row, also known as a tuple, represents an entity that is useful or meaningful to the business or other database user, and each column in that row refers to a data element that defines a characteristic or attribute of that entity. For example, each row in a company's database of its employees may refer to a certain employee. One column may refer to an employee's name, another column to an employee's identification number, and another column to an employee's address.

Relational databases have thus been commonly used to facilitate the efficient storage and retrieval of data. These relational databases have been well suited to working with traditional procedural programming techniques. For example, a feature of most procedural programming languages allows a programmer to access an element of a table by specifying its row and column. Although a program would not necessarily access a database element using that feature of the programming language, the point is to note that relational schema and procedural programming share common concepts and programming philosophies.

In contrast, object-oriented programming techniques do not inherently interface smoothly with relational databases. For example, the concept of indexing a table of data elements by row and column is itself somewhat at odds with the object-oriented philosophy of handling an object in accordance with what it represents rather than how it is represented in a rigid data structure.

Despite the recent development of dedicated object-oriented databases, large amounts of data remains stored in existing legacy relational databases. Thus, there is a significant need to facilitate efficient interactions between these legacy relational databases and the newer object oriented systems. There has been specialized software developed to interface object-oriented software to relational databases. Such software typically includes a development tool, sometimes referred to as a scheme mapper, that allows a database programmer to map the legacy relational schema to a new object schema. Thus, although the objects are ultimately stored in the legacy relational format, the storage format is transparent to the application program which can access the objects using object oriented techniques.

One significant limitation in these systems is the difficultly in effectively partitioning the new object schema in a way that provides for increased database efficiency and reliability. Partitioning objects is the logical subdividing of objects into groups having a common characteristic. For example, "employee" objects could be partitioned into groups corresponding to their department. This allows for increased efficiencies because queries can specify what partition to search for objects in and avoid searching large amounts of unneeded objects. Additionally, partitioning can be used to promote security by providing a mechanism that can be used to limit access to certain types of objects. Using the employee object example again, partitioning to could be used to ensure that one person's access is limited to employee objects for a specific department.

When a new object oriented application is integrated with a new or legacy relational database system, it can be very difficult to provide for effective partitioning while melding the two distinct schema. Thus, what is a needed is a mechanism for integrating relational database systems with object oriented systems that provides for efficient partitioning of objects in the object oriented system.

DISCLOSURE OF THE INVENTION

According to the present invention, a system and method is provided that allows transparent and flexible partitioning of created objects. The present invention relates to a schema mapping mechanisms for mapping an object between the object-oriented schema of an application program and the relational schema of a database in which the object is persisted. The schema mapping mechanism allows a developer to map class attributes in objects to columns in the database. The mapping is performed prior to the time the application is run ("run-time"), and is defined in a high level schema mapping language. Additionally, by allowing a developer the map class attributes to the columns of an existing table the preferred embodiment supports object oriented interaction with existing legacy databases.

The preferred schema mapping mechanism uses partition key values to facilitate partitioning of the created objects. The partition key value for an object determines what partition that object belongs in. To facilitate the most flexible schema mapping and partitioning, the partition key value for an object can be defined by the developer to be an attribute of an owning object, a primary key field of an owning object, or constant defined for its class. For example, the developer can specify a field of the primary key of an owning value to be the partition key value for the owned objects. When new owned objects are created the partition key values are retrieved from their specified location in the owning object to determine the partition in which the new owned object belongs.

In the preferred embodiment the developer also specifies a corresponding column of fields in the owned objects table to store the partitioning key values. Preferably, the partitioning key values are stored as a subset of the primary key field for the owned object. Because the primary key field is used to uniquely identify the corresponding object, the partition information in the partition key value partially determines the unique identifier of the owned object. Including the partition information as part of the identity of the owned object allows queries to performed against a partition without requiring the user to have any specific knowledge of the partitioning structure. Thus, the preferred embodiment thus provides the advantages of transparent and flexible partitioning of objects.

The foregoing and other features and advantages of the present invention will be apparent from the following more particular description of the preferred embodiment of the invention, as illustrated in the accompanying drawings.

BEST MODE FOR CARRYING OUT THE INVENTION

As discussed in the Summary section, the present invention was developed using Object-oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

1. Overview

Object-oriented Technology v. Procedural Technology

Object-oriented programming is a method of program implementation in which programs are organized as cooperative collections of objects, each of which represents an instance of some class, and whose classes are all members of a hierarchy of classes united via inheritance relationships. Object-oriented programming differs from standard procedural programming in that it uses objects, not algorithms, as the fundamental building blocks for creating computer programs. This difference stems from the fact that the design focus of object-oriented programming technology is wholly different than that of procedural programming technology.

The focus of procedural-based design is on the overall process used to solve the problem; whereas the focus of object-oriented design is on casting the problem as a set of autonomous entities that can work together to provide a solution. The autonomous entities of object-oriented technology are, of course, objects. Object-oriented technology is significantly different from procedural technology because problems are broken down into sets of cooperating objects instead of into hierarchies of nested computer programs or procedures.

Thus, a pure object-oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what service to perform.

There are many computer languages available today that support object-oriented programming. For example, Smalltalk, Object Pascal, C++ and Java are all examples of languages that support object-oriented programming to one degree or another.

One issue in object oriented programming is object persistence. Persistent objects, as opposed to transient objects, have a lifetime that transcends the lifetime of the program that created them. To make an object persistent, mechanisms must be put in place to allow the object to survive the process that creates it so it can be accessed by other processes.

Object-oriented Frameworks

There has been an evolution of terms and phrases which have particular meaning to those skilled in the art of object-oriented design. However, the reader should note that one of loosest definitions in the art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe a mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

While in general terms an object-oriented framework mechanism can be properly characterized as an object-oriented solution, there is nevertheless a fundamental difference between a framework mechanism and a basic object-oriented solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to framework consumers because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

2. Detailed Description

Figure 1:
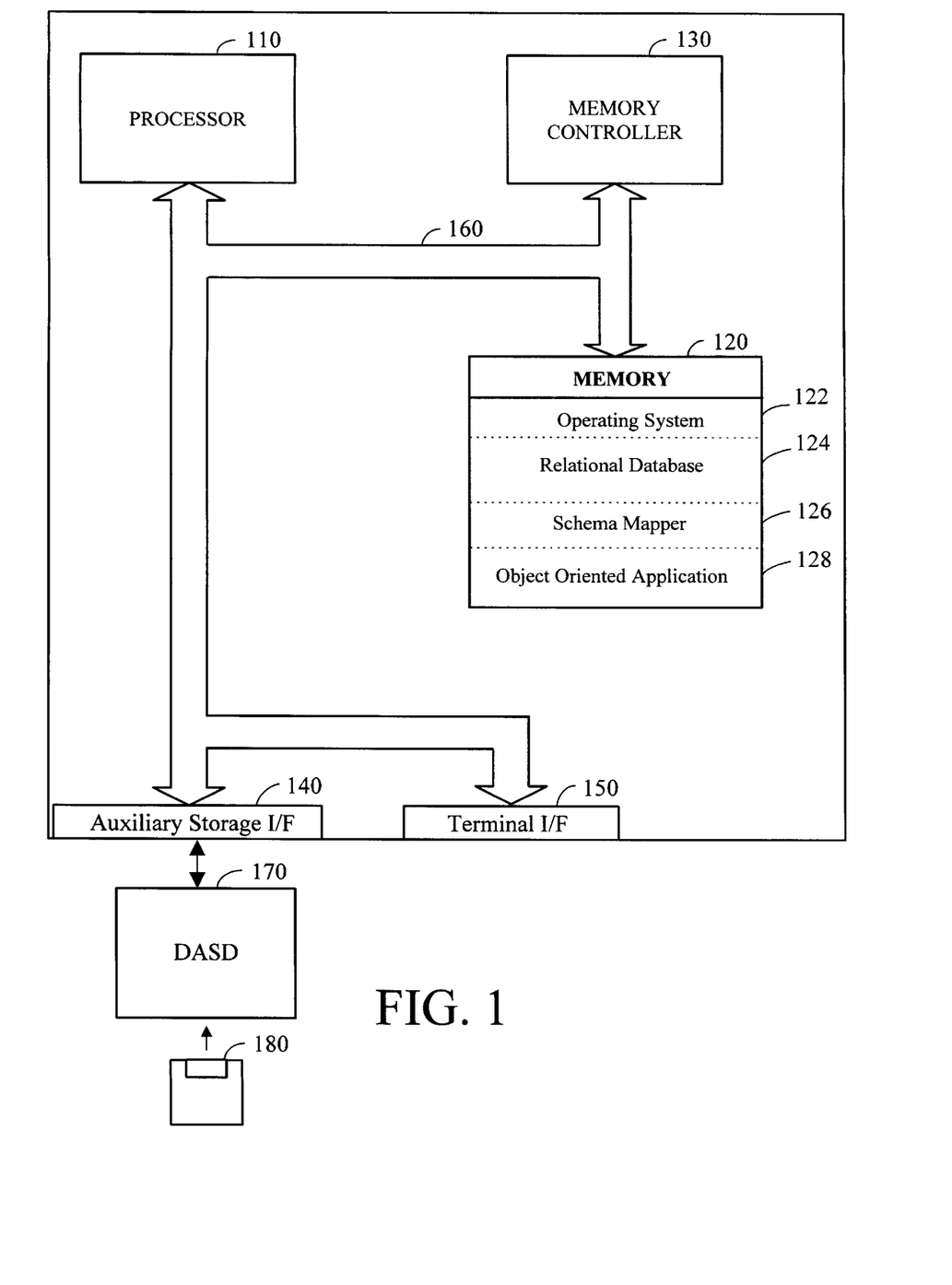
FIG. 1 is a schematic view of a computer system in accordance with a preferred embodiment of the present invention.

Referring now to FIG. 1, a computer system 100 in accordance with a preferred embodiment of the present invention is illustrated. Those skilled in the art will appreciate that the method and apparatus of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 10 may comprise a single integrated circuit, such as a microprocessor, or may comprise any suitable number of integrated circuit devices and/or circuit boards working in cooperation to accomplish the functions of a processor. Processor 110 suitably executes object-oriented computer programs within main memory 120.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links, including wireless communication links.

Memory controller 130, through use of a processor is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports-directional communication in a computer-related environment could be used.

In the preferred embodiment, memory 120 suitably includes an operating system 122, relational database 124, a schema mapper 126, and a object-oriented application 128. It should be understood that for purposes of this application, in memory 120 is used in its broadest sense, and can include Dynamic Random Access Memory (DRAM), Static RAM (SRAM), flash memory, cache memory, etc. While not explicitly shown in FIG. 1, memory 120 may be a single type of memory component or may be composed of many different types of memory components. For example, memory 120 and CPU 110 may be distributed across several different computers that collectively comprise system 100. It should also be understood that programs in memory 120 can include any and all forms of computer programs, including source code, intermediate code, machine code, and any other representation of a computer program.

The operating system 122 provides the basic functionality that controls the computer system 100. Operating system 122 can comprise any suitable operating system, such as IBM's OS/400, OS/2, Microsoft's Windows, Java and the various flavors of UNIX. The relational database 124 provides the mechanism for persistently storing object data in the computer system 100, and can be any suitable relational database such as those available from IBM, Oracle or Microsoft. The object-oriented application 128 can be any object oriented application that uses the data stored in the relational database 124. The schema mapper 126 provides for mapping between the object-oriented schema of an the application program 128 and the relational schema of the relational database 124 in which the object data is persisted.

Figure 2:
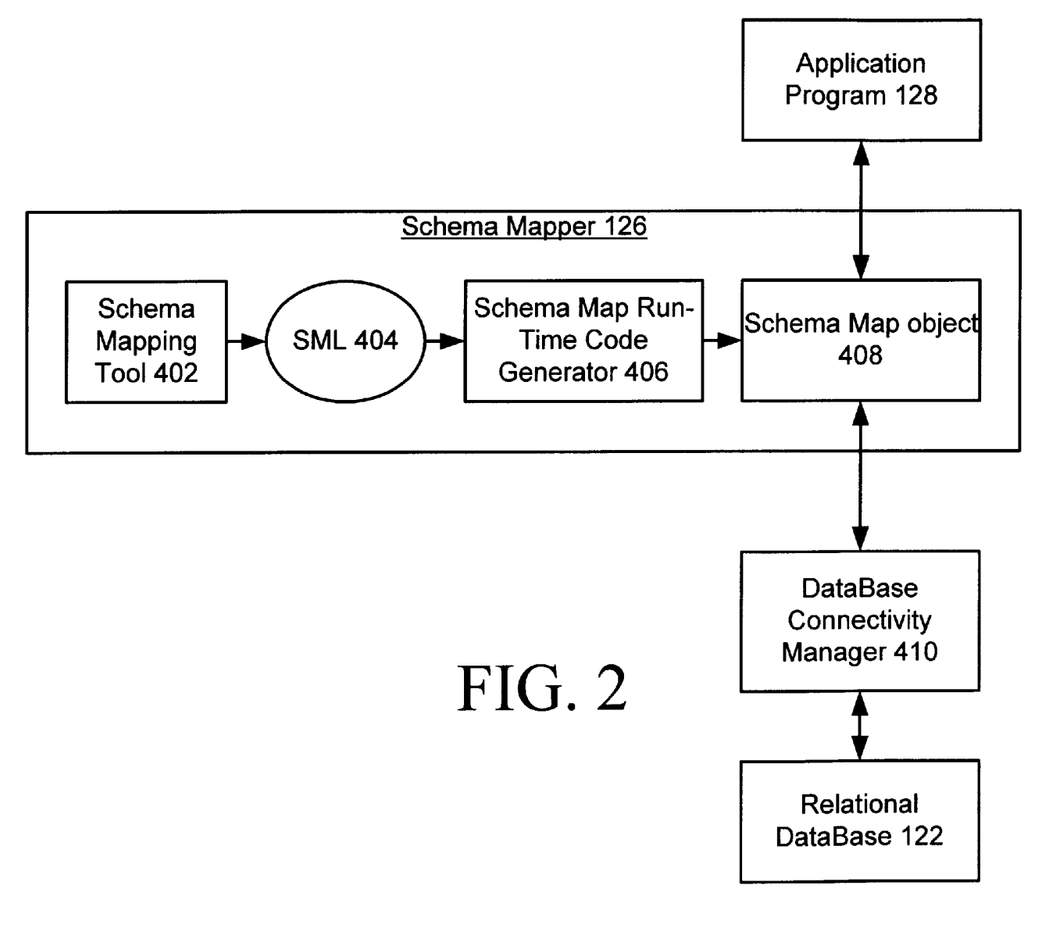
FIG. 2 is a functional block diagram a schema mapper, relational database and application program in accordance with the preferred embodiment.

Turning now to FIG. 2, the preferred embodiment of the present invention is illustrated in more detail to better illustrate the salient features. One aspect of the invention relates to events that occur prior to the time an application program is run, which is referred to as schema mapping time, and another aspect of the invention relates to events that occur at application program run-time. Preferably, the schema mapper 126 provides the functionality needed to perform the schema mapping during schema mapping time. In particular, the schema mapper 126 preferably includes a schema mapping tool 402 used at schema mapping time to generate a schema mapping language (SML 404) definition that defines the mapping between objects and the relational database tools. After the schema mapping tool 402 has generated the SML 404, a schema map run-time code generator 406 parses SML 402 and links or connects it with the entities defined in an application program to produce executable or runtime mapping code. The run-time mapping code is stored in a schema map object 408.

SML 404 is preferably written in a high-level language, the relevant syntax of which is described in U.S. Pat. No. 5,878,441, filed Jun. 26, 1997, entitled "DEPENDENT PERSISTENCE," and U.S. patent application Ser. No. 08/912,020, filed Aug. 15, 1997, entitled "LEGACY SUBCLASSING," which are incorporated herein by reference. Mapping between object schema and relational schema is also described in, for example, U.S. Pat. No. 5,629,979, titled "A SYSTEM AND METHOD FOR PROVIDING A GRAPHICAL USER INTERFACE FOR MAPPING AND ACCESSING OBJECTS IN DATA STORES," which is incorporated herein by reference. Schema Mapping to legacy tables with primary keys is described in a related U.S. patent application, Ser. No. 08,978,656, filed Mar. 16, 1997, entitled "SCHEMA MAPPING TO A LEGACY TABLE WITH PRIMARY AND FOREIGN KEY SUPPORT", which is also incorporated by reference. Because such mapping techniques are known, the full capabilities and features of schema mapping tool 402 and SML 404 it uses generates are not discussed in the present specification. Schema mapping tool 402 and SML 404 may have any other suitable features, such as those described in the above-referenced patent specifications. Although schema mapping tool 402 and SML 404 may have such features, for purposes of clarity the description in the present specification focuses on those new features of schema mapping 402 that relate to the partitioning methods of the present invention.

Again, after the schema mapping tool 402 has generated the SML 404, a schema map run-time code generator 406 parses SML 402 and links or connects it with the entities defined in an application program to produce executable or runtime mapping code, which is then stored in schema map object 408. The schema map object 408 interfaces to an database connectivity manager 410. The database connectivity manager 410 provides the interface between the schema map object 408 and the relational database 410. The database connectivity manager 410 can be any suitable manager, such as an open database connectivity (ODBC) manager, as specified by Microsoft Corporation of Redmond. As another example, the database connectivity manager 410 can be a Java database connectivity (JDBC) manager, developed by Sun Microsystems of Mountain View, Calif., which is similar and is intended to be used in a Java environment. Both ODBC and JDBC include a driver manager and driver components. ODBC and JDBC are call-level interfaces, meaning that they consist of a set of function calls in a high-level application programming language, such as C, C++ or Java. A driver implements an application program interface (API) that Supports a particular database system. An application program may call ODBC or JDBC functions to store, retrieve or delete data. In response to these calls, the driver generates SQL statements that are suited to the particular database management system.

Because those persons skilled in the art of the present invention are ordinarily familiar with ODBC and JDBC, further details regarding their architecture and use are not provided in this patent specification. Background information that may be of interest to software developers may be found in, for example, Kyle Geiger, Inside ODBC, Microsoft Press, 1995.

Although the present invention may be embodied in a non-networked computing system, it is more preferably embodied in a client-server computing system. In this case, the application program 128 is distributed between a server application program and a client application program in any suitable manner that is conventional in client-server computing. In a similar vein, schema mapper 126 may be used remotely. Essentially, the functional elements of the present invention may be distributed among any suitable computing systems that are networked to one another.

The persistent states of the entities are stored in a relational database 122. At run-time, the application program may request that an entity whose persistent state is stored in database 122 be restored. In response to this request all of the data necessary to fill in the object is retrieved from the relational database 122. Likewise, at run time the application program may request the addition of a new entity into persistent storage. In response to this request a new row will be added to the corresponding table in relational database 122.

In accordance with the preferred embodiment of the present invention, the schema mapper 402 also provides mechanisms for defining object partitioning. The preferred schema mapping mechanism uses partition key values to facilitate partitioning of the objects instantiated from the relational database 122. The partition key value for an object determines what partition that object belongs in. To facilitate the most flexible schema mapping and partitioning, the partition key value for an object can be defined by the developer to be an attribute of an owning object, a primary key field of an owning object, or constant defined for its class. For example, the developer can specify a field of the primary key of an owning value to be the partition key value for the owned objects. When new owned objects are created the partition key values are retrieved from their specified location in the owning object to determine the partition in which the new owned object belongs.

In the preferred embodiment the developer also specifies a corresponding column of fields in the owned objects table to store the partitioning key values. Preferably, the partitioning key values are stored as a subset of the primary keys for the owned object. Because the primary key is used to uniquely identify the corresponding object, the partition information in the partition key value partially determines the unique identifier of the owned object. Including the partition information as part of the identity of the owned object allows queries to performed against a partition without requiring the user to have any specific knowledge of the partitioning or primary key structure. Thus, the preferred embodiment thus provides the advantages of transparent and flexible partitioning of objects.

Figure 3:
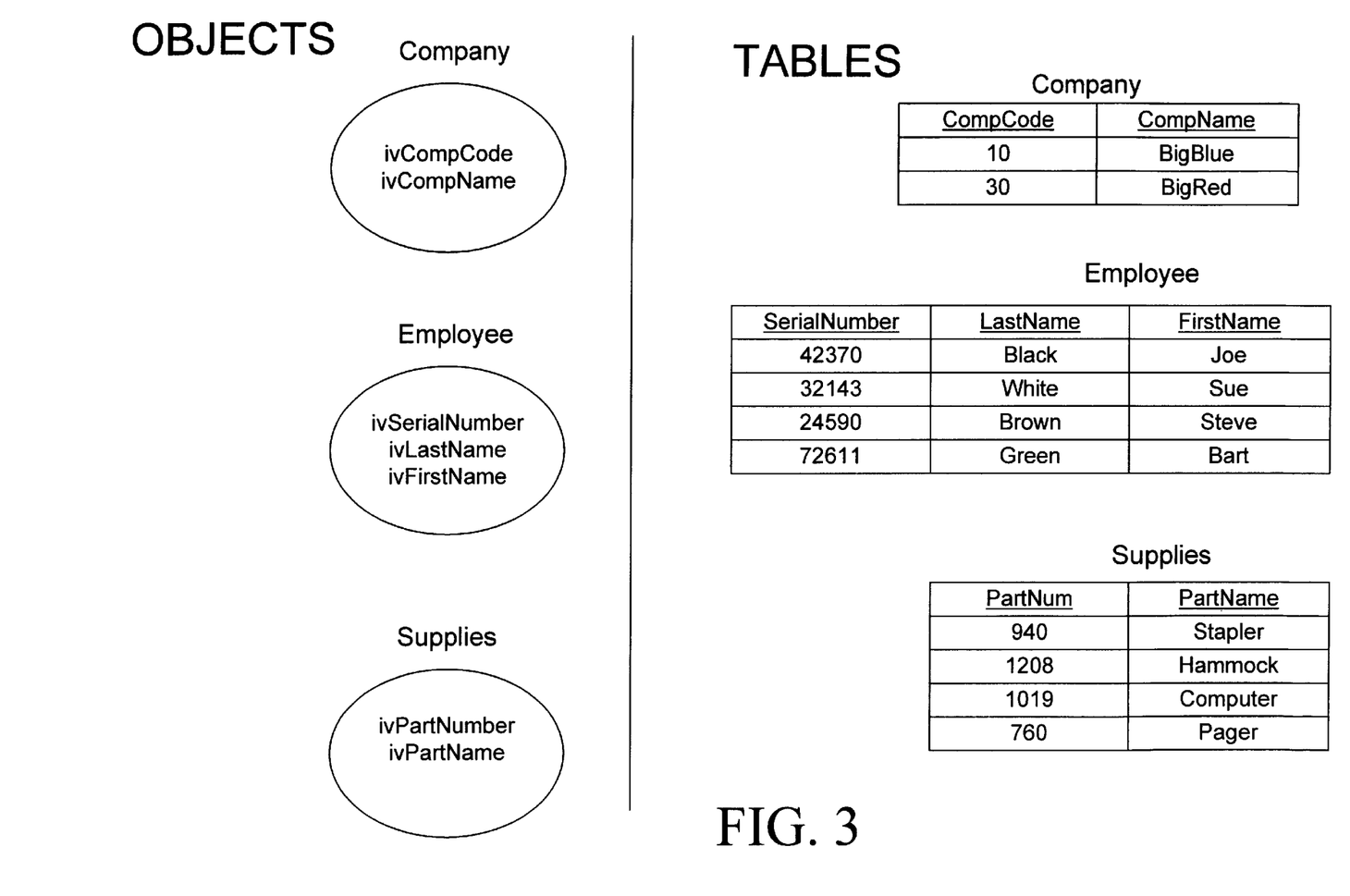
FIG. 3 is functional block diagram illustrating mapping of objects to relational database tables.
Figure 4:
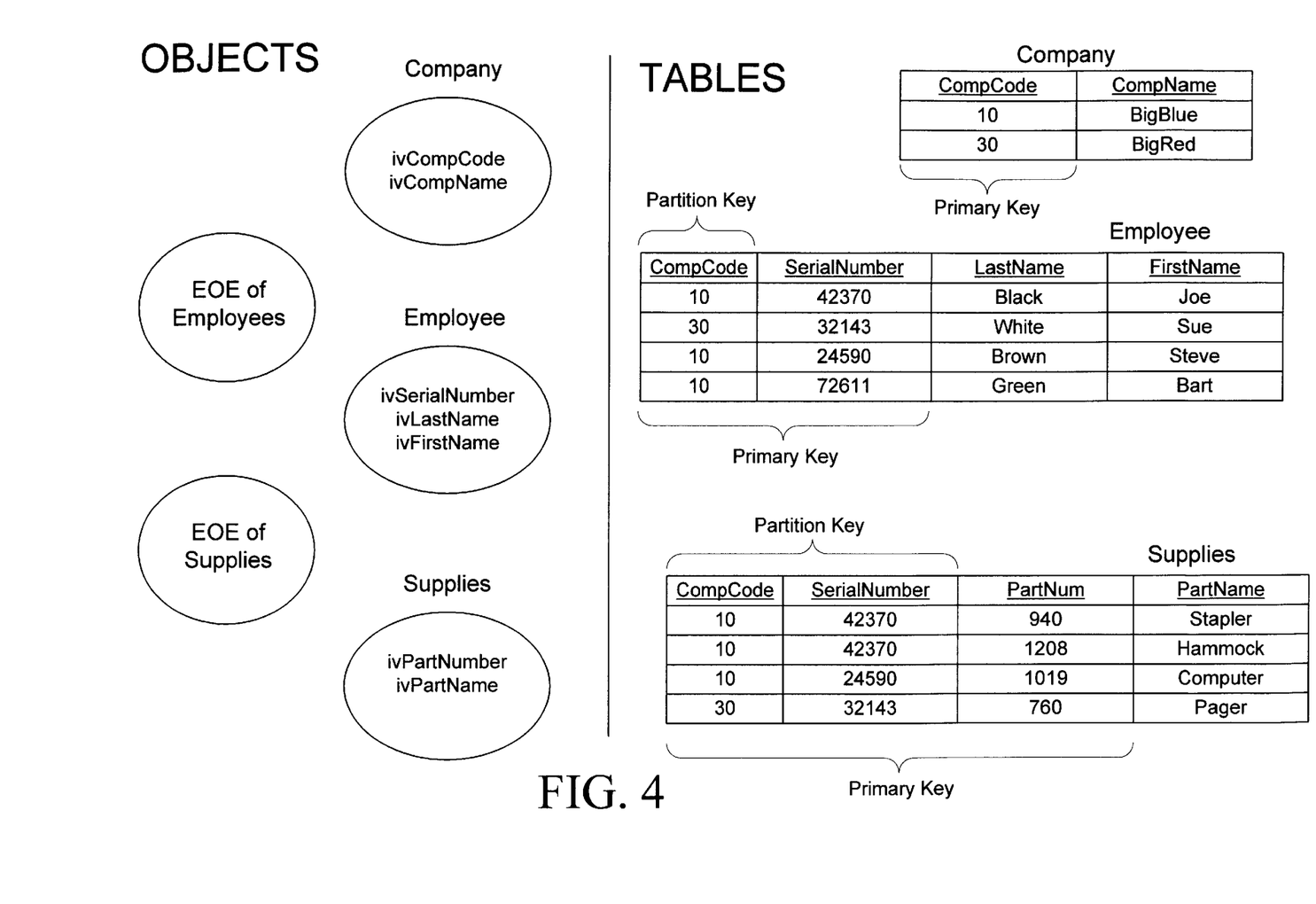
FIG. 4 is functional block diagram illustrating mapping of objects to relational database tables include the use of partition keys to facilitate partitioning.

Turning now to FIGS. 3 and 4, an example of object partition in accordance with the preferred embodiment will now be given. FIG. 3 illustrates exemplary persistent data stored in Company, Employee and Supplies tables. FIG. 3 also illustrates the type of mapped objects that would come from the Company, Employee and Supplies tables. In particular, Company objects, Employee objects and Supplies objects. As a general rule, each table corresponds to a class of objects (i.e., a company class, an employee class and a supplies class ) and each row in the table corresponds to an instantiated object from the corresponding class. Thus, in the example of FIG. 3 there would be two Company objects, corresponding to the two rows in the company table, four Employee objects corresponding to the four rows in the employee table, and four supplies objects corresponding to the four rows in the supplies table.

Each class of the object includes one or more attributes that correspond to one or more columns in the corresponding table. In the illustrated example, the company object includes an ivCompCode attribute and an ivCompName attribute that corresponds to the CompCode and CompName column respectively. In the company object corresponding to row 1, the ivCompCode attribute would be 10 and the ivCompName attribute would be BigBlue. Likewise, in the employee object corresponding to employee row 3, the ivSerialNumber attribute would be 24590, the ivLastName attribute would be Brown, and the ivFirstName attribute would be Steve. The assigning of column values to corresponding attributes is part of the mapping performed by the Schema mapper at mapping time. It should be noted that not all column fields must correspond to object attributes and vice versa.

It should be noted that the both the objects and the relational table data are organized in a hierarchal fashion. For example, the Company object "owns" the Employee objects. Likewise, the Employee object owns the supplies objects. Thus, the Company and Employee objects are said to be in the "owning hierarchy" of the Supplies objects.

In addition to mapping object attributes to table attributes as illustrated in FIG. 3, the preferred schema mapper 126 can be used to partition classes of objects into one or more distinct partitions, where a partition is a subgroup of a class of objects. This includes defining partition keys used to partition objects, storing these partition keys with the objects and creating objects used to store the partitioning information. Turning now to FIG. 4, the example of FIG. 3 is illustrated after partitioning in accordance with the preferred embodiment.

The schema mapper 126 is first used to identify the source of user-defined partition key values, i.e, where to retrieve the partition key values for comparison during mapping. These partition key values are then stored within the table, either in columns corresponding to attribute fields or as non-attribute columns, or as part of the primary key of the owned object (as will be explained in more detail later).

In the preferred embodiment, the source of the partition key values is a designated foreign partition key from an owning object. In this application, the term "foreign partition key" is defined as a field from an owning object that which is exported from the owning object and whose value is made available to be used to partition the owned objects. Thus, the foreign partition keys are fields which can be referenced during mapping as sources of partition key values. In the illustrated example, the ivCompCode attribute in the company objects is exported and made available for use in partitioning the employee objects. Likewise, the ivSerialNum attribute in the employee objects is exported and made available for use in partitioning the supplies objects. Additionally, the ivCompCode is exported through the employee object for use as in partitioning the object.

As illustrated in FIG. 4, the exported values are added to the corresponding relational table for use as partition key values. In this example, the CompCode column in the employee table can serve as a partitioning field. This allows the corresponding employee objects to be partitioned according to their CompCode. In particular, rows 1, 3 and 4 would belong to one partition, while row 2 would belong to another partition. Likewise, a CompCode column and a SerialNum column in the supplies table to serve as partitioning fields. This allows the corresponding supplies objects to be partitioned according to the combination of CompCode and SerialNum. Thus, rows 1 and 2 would belong to one partition, row 3 would belong to a second partition, and row 4 would belong to a third partition.

It should be noted that the partitioning keys could also be an automatically system generated unique identifier. This would allow system defined partitioning for use with the default schema mapping scheme. The automatically generated unique identifier can be used to partition the objects, alleviating the application programmer from requiring to give any explicit information about the partitioning key.

Another important feature of the preferred embodiment is that the designated partition keys stored in the relational tables can be part of primary keys for those tables. Primary key are fields used to uniquely identify a particular row. In previous systems, the primary key fields have been used to create the unique identifier for the corresponding object. Thus, the primary keys provide a link between a row in the database and the corresponding object.

The primary key can comprise an one or more previously defined attributes, or it can comprise one or more non-attribute columns used to store the primary key fields. For example, in the company table, the CompCode column could be designated as a primary key. This assumes of course that each row in the table has a unique company code that can be used to uniquely identify its row. Thus, the primary key for row 1 is 10, and the primary key for row 2 is 30. Likewise, the CompCode and SerialNumber columns in the employee table can be combined to function as the primary keys. Thus, the primary key for row 1 is 10 42370 and the primary key for row 2 is 30 32143. Again, this would assume that each row has a unique combination of company code and serial number. As a third example, the CompCode, SerialNumber and PartNum columns of the supplies table could be designated as the primary key. Thus, the primary key for row 1 is 10 42370 940 and the primary key for row 2 is 10 42370 1208. All of these primary key values can then be used to generate the unique identifier for the corresponding object.

It should be pointed out that an important advantage of the present invention is that the partition values used to partition objects can be stored as all or part of the primary key values. Put another way, by mapping the partition key to a primary key field effectively includes the value of the partition key field as part of the primary key for the owned object. Storing partitioning information as part of primary key of object allows queries to performed against a partition without requiring the user to have any specific knowledge of the partitioning structure.

Figure 5:
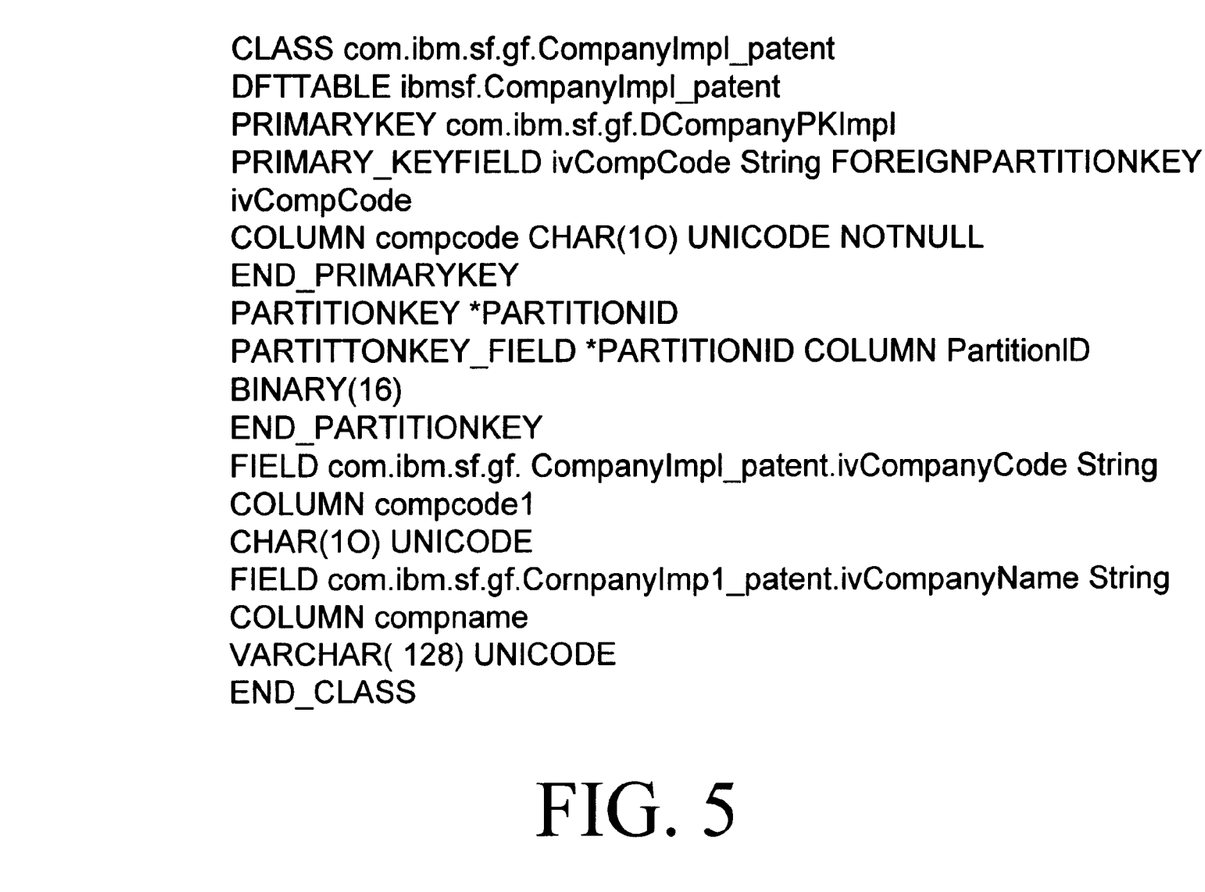
FIGS. 5, 6 and 7 are exemplary portions of schema mapping language code in accordance with the preferred embodiment.
Figure 6:
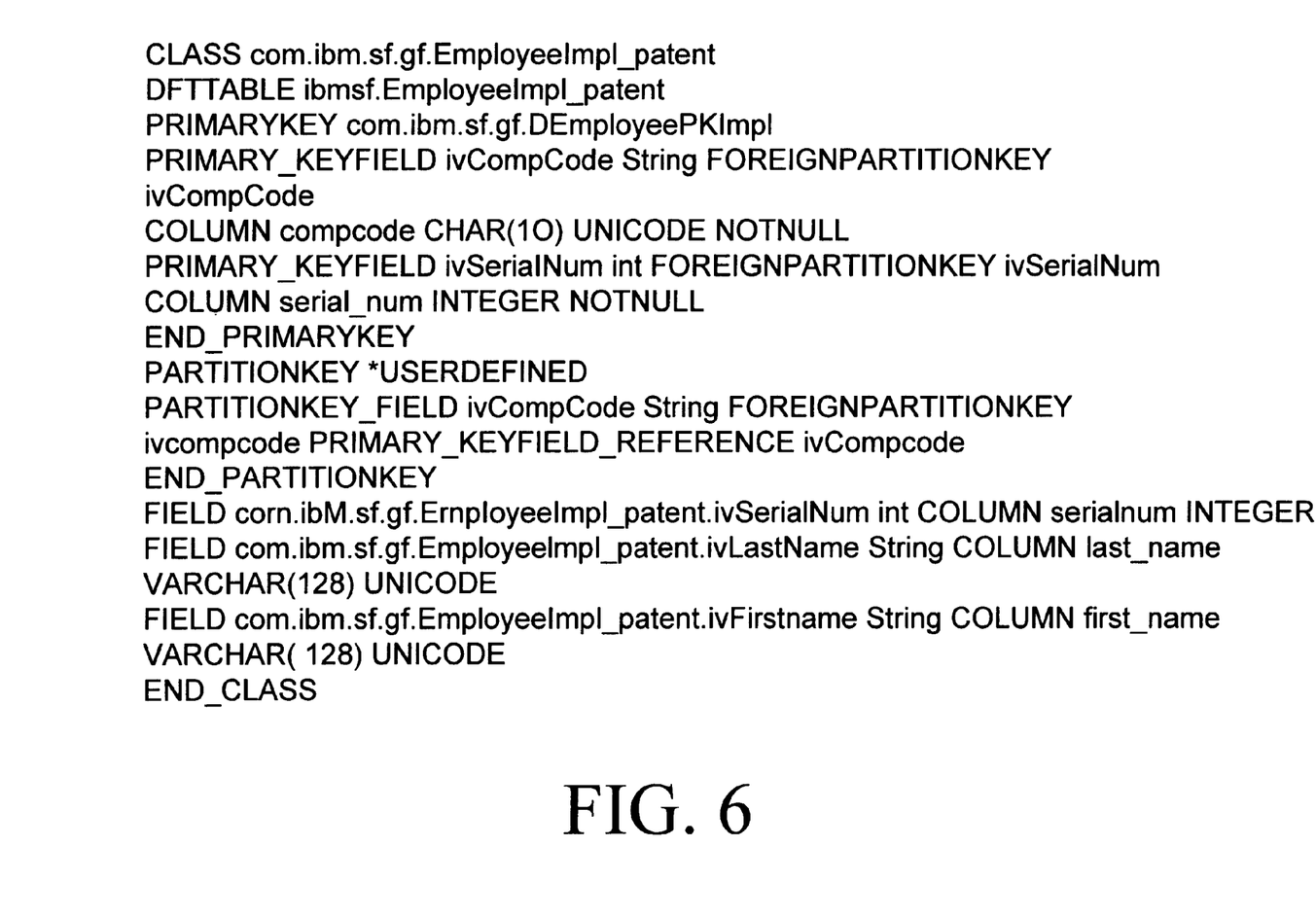
Figure 7:
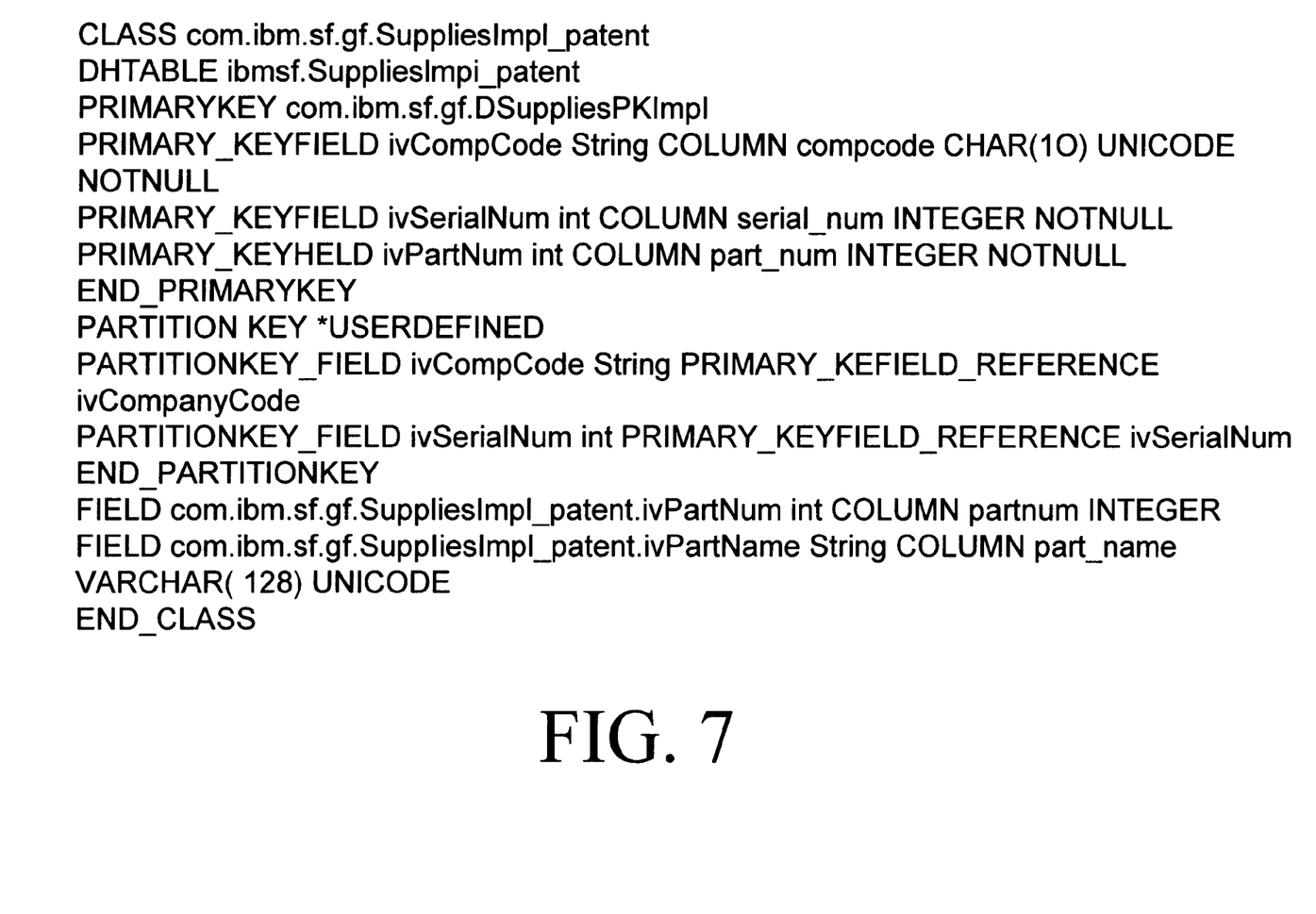

It should also be noted that FIGS. 3 and 4 illustrate only one of the many ways in which partition key information can be stored. In addition to being stored as part of the primary key values, the preferred schema mapper 126 preferably allows partition key values to be stored in a new column definition or as other columns in the table Turning now to FIGS. 5, 6 and 7, exemplary SML mapping attributes and the delineation of partition key values and partition keys for company, employee and supplies objects are illustrated. This examples show how a developer can use SML to creating the mapping illustrated and discussed with reference to FIGS. 3 and 4.

Returning now to FIG. 4, in the preferred embodiment, the application program 128 creates partition objects used to "contain" the objects in each partition. These objects will be referred to as Entity Owning Extents (EOE). EOE objects provide the interface to objects in a partition and allow generic queries to be done selective to partitions. When a given class of objects is divided into partitions, a corresponding EOE object for each partition is created. Each EOE object includes references to all objects in its partition and thus "contains" these objects. The EOE objects can the be used to efficiently access and search objects in a specified partitions.

In the Example of FIGS. 3 and 4, when employee objects are created and mapped to the employee table, two EOE of Employees objects are created to contain the references to their corresponding employee objects, one storing references for objects corresponding to rows 1, 3 and 4, and the other storing references to the object corresponding to row 2. References to the EOE of Employees objects themselves are preferably created and stored in the owning (i.e., company) objects. Because the employee objects are owned by the company objects, each employee EOE objects is said to be contained in its corresponding company object. Likewise, EOE of Supplies objects are created which contain references to their corresponding supplies objects, and references to the EOE of Supplies objects themselves are stored in the employee objects.

In the preferred embodiment, EOE objects "own" all the objects within its partition, with the partitioning key value being the mechanism by which ownership is established. Thus, when an EOE object is deleted, all objects in its partition are also deleted.

EOE objects are preferably designed to be created once and used many times. Thus, at schema mapping time the EOE objects are defined. When the EOE is created and throughout the life of the application, new objects belonging to the corresponding partition are created into the EOE. Thus, EOE objects are preferably persisted as the other objects using relational database tables.

Again, each EOE object stores references to each of its corresponding objects in its partition. Each EOE thus provides a collection that maps directly to the underlying data store and provides support for a partitioning key to allow multiple such partitions over the same table. The EOE objects also preferably include an iterator that maintains ties to the underlying data store and is used to access elements of the EOE.

An EOE object is thus a view over a database as defined by the schema mapper with one exception. When the iterator is created over the objects in the underlying table, an additional where clause must be provided that limits the result set to the objects matching the partitioning key. The schema mapper is responsible for converting the partitioning key into a set of columns in the table. Therefore, it must be left up to the schema mapper to provide this additional where clause.

To summarize, each EOE object preferably contains by reference all objects of a given corresponding class or subclass that match the partitioning key value of the EOE. If an object is created into a table without explicitly specifying a partition, the object will be given a null partition key value. Thus, the EOE object uses the partitioning key value to establish ownership over objects it contains. In particular, partitioning keys allow any given table in the relational database table to be partitioned into multiple extents, with each extent then assigned to a EOE. The EOE objects thus provide a synergy to the underlying persistence mechanism that allows the system to take advantage of many underlying efficiencies. For example, because the EOE objects are tied to the relational tables used for persistent storage a number of efficiencies such as indexes over a column and fast query support are facilitated.

In the preferred embodiment the EOE keeps the partitioning key opaque to database users. Thus, a database user does not need to know the underlying data storage scheme in order to specify a partitioning key. This means that the user does not need to know the names of the columns the partitioning key is mapped to. Instead, the containing object can be used to determine the values for the partitioning key of the objects created into the EOE.

When querying an extent, an application program uses a partition key to subset the entries needed to be processed in order to satisfy the query. By allowing partitioning based on the primary key of an owning object as well as the converse—determining the partition in which an object resides based on its unique identity (i.e., based on its primary key), the application developer is insulated from and not required to know the details of both the partitioning decisions and unique identity decides. This affords maximum flexibility in application development and deployment.

Figure 8:
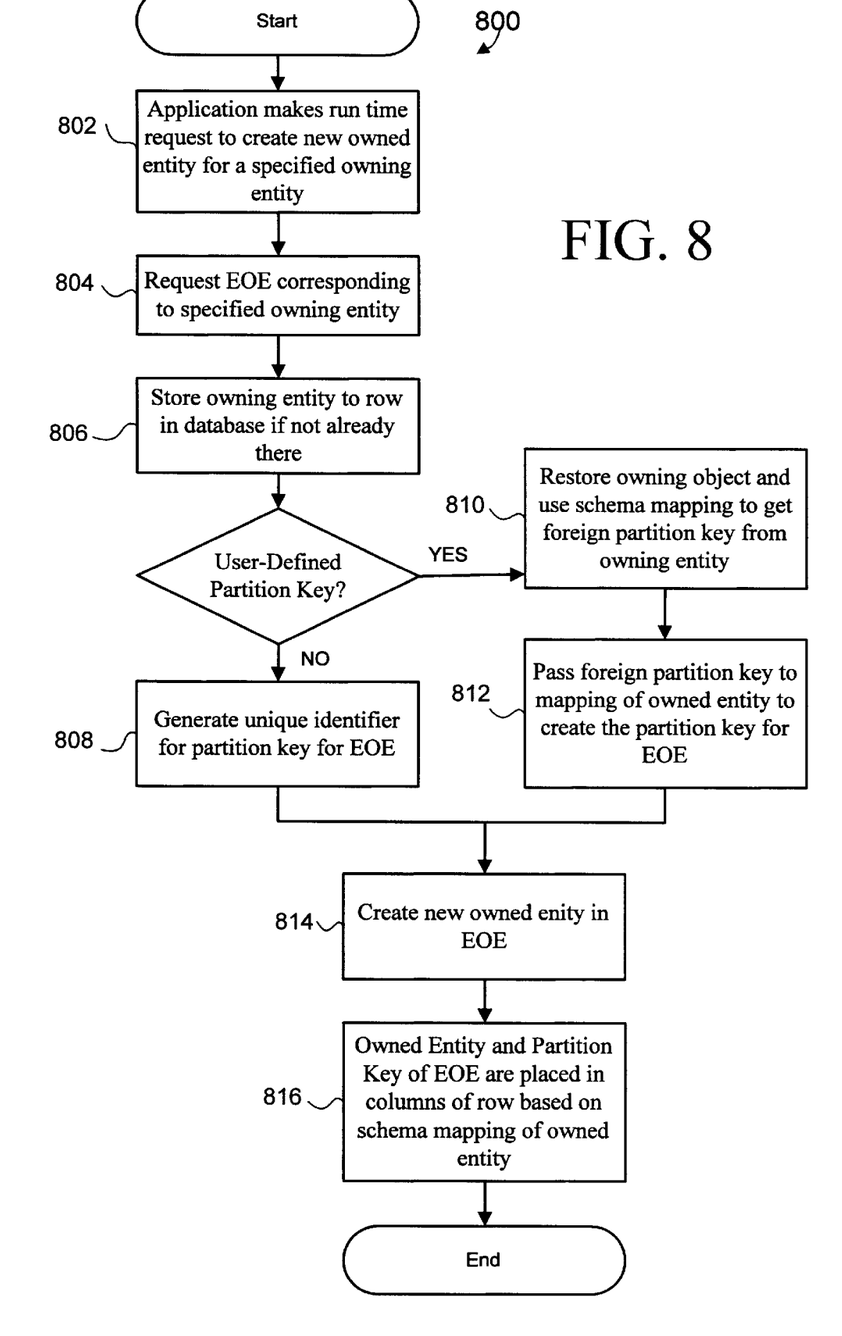
FIG. 8 is a flow diagram illustrating a method in accordance with the preferred embodiment.

Turning now to FIG. 8, a method 800 illustrates the preferred implementation and use of the present invention at run. Method 800 occurs after the developer has perform the preferred schema mapping. This is preferably accomplished by creating schema mapping code using a schema mapping language (SML). The schema mapping code defines the mapping between persistent storage in relational database tables and objects. As discussed above, this mapping preferably includes the defining and mapping of both partition key values and partition keys used to partition selected tables into two or more partitions. This mapping also defines the mapping of EntityOwningExtent (EOE) objects for each partition of each table. Again, as discussed above, these EOE objects include references to all objects in its corresponding partition and thus owns these objects.

After schema mapping has been performed, the system is ready for run-time. The first step 802 of method 800 is when an application makes a run time request to create a new owned entity for a specified owning entity. Using the previous examples, an application can request to create a new employee object in a specified company object. The next step 804 is for to request an EOE object corresponding to the specified owning entity. As discussed above, EOE objects include references to all objects in the corresponding partition.

The next step 806 is to store the entity data for the owning entity in the appropriate row of the appropriate table if the data for the owning entity it has not been previous stored. For example, if the new owned entity is a new employee object for a new company object, data for that new company object would need to first be stored in the a new row in the company table. This persistently stores the data needed to restore this object when needed (for example, in step 810).

With the data for the owning object stored, or if it was previously stored, the next step is step 808 if a user defined partition key is not used to classify the new owned object and step 810 if a user defined partition key is used.

In step 808, an automatically generated unique identifier is created for use as a partition key value. An automatically generated unique identifier is mainly for use with the default schema mapping scheme, where the system defines the partition key and partition key value. The automatically generated unique identifier can be used to partition the objects, alleviating the application programmer from requiring to give any explicit information about the partitioning key.

If a user-defined partition key is used then a partition key value from the owning object is used. Thus, in step 810 the owning object is restored such that the partition key value for the new owned object can be retrieved from the owning object. This involves restoring the owning object with data from its relational table row, if it has not already been restored. As discussed above, the partition key is preferably made foreign such that it can be made public and exported to owned entities. Thus, the next step 814 is for the partition key to be passed to the mapping of the new owned object, with the partition key being stored in the previously defined column in the table. This will allow the new owned object to be restored to the proper partition at a later time. Again, the column used to store the partition key for the owned object can be a field in the primary key, a field in an object attribute, or a column in the table that is not an attribute of the object.

With the partition key stored in the appropriate location, the next step 814 is to add the newly created contained entity to the appropriate EOE object. This involves adding/storing a reference to the new object in the EOE object.

The next step 816 is to store the contained entity data and partition key into columns and rows based on schema mapping of contained entity. This persistently stores the object data along with its partitioning information. If and when that object is restored the partitioning information can be used to partition the restored object with the correct EOE.

This processes of method 800 is preferably performed for all the objects the application program will use. This results in the objects persisted in the tables, included the partition key stored in the appropriate field. When this is done, a search can be made of objects in a specified partition without having to restore all the objects in the class. Instead, only the objects of the specified partition in the class need to be restored for the query to performed. Generic queries can be used to search each EOE without the need for the application developer to be aware of the primary key and partitioning decisions done at schema map time as part of the object and relational database administration.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. For example, while the preferred embodiment has been described with reference to an object-oriented framework solution, it could also be implemented with another component based programming environment. The description as set forth is not intended to be exhaustive or to limit the invention to the precise form disclosed. Many modifications and variations are possible in light of the above teaching without departing from the spirit and scope of the forthcoming claims.

What is claimed is:

1. An apparatus comprising:
   at least one processor;
   a memory coupled to the at least one processor;
   a computer program residing in the memory and being executed by the at least one processor, the computer program including schema mapper for mapping between object attributes and fields in a database table, the schema mapper including a mechanism for defining a source of a partitioning key value and defining a partitioning key field in the database table for storing the partitioning key value, the partitioning key value identifying a partition containing the object within a class of objects, the partition defining a subclass of objects with the class.

2. The apparatus of claim 1 wherein the schema mapper stores the partition key value in a portion of a primary key, and wherein the primary key defines a unique identifier of the object such that the partition key value is made part of the unique identifier of the object.

3. The apparatus of claim 1 wherein the database table stores the object attributes for a class of objects, and wherein each row in the database table stores the attributes for a corresponding one of the class of objects, and wherein each row includes a partition key value to divide the class objects into partitions.

4. The apparatus of claim 1 wherein the schema mapper defines the source of the partition key value to be an attribute in an owning object.

5. The apparatus of claim 1 wherein the schema mapper defines the source of the partition key value to be an automatically generated unique identifier used to partition according to a default schema.

6. The apparatus of claim 1 wherein the schema mapper creates an entity owning extent object corresponding to each partition, and wherein the entity owning extent stores a reference to each object in the corresponding partition.

7. The apparatus of claim 6 wherein the entity owning extent object for each partition facilitates the partition specific queries by insulating such queries from specific details of partitioning decisions and unique identity decisions.

8. The apparatus of claim 6 wherein each entity owning extent object include mechanism for adding new objects to its corresponding partition.

9. The apparatus of claim 6 wherein each entity owning extent object includes an iterator for retrieving objects from the entity owning extent.

10. The apparatus of claim 1 wherein a schema mapping language is used to by a developer to defining the source of a partitioning key value and defining the partitioning key field in the database table for storing the partitioning key value.

11. The apparatus of claim 1 wherein the objects are part of an object oriented framework for modeling a business process and wherein the relational tables are legacy tables and wherein the schema mapper provides a mechanism for linking the object oriented framework and the legacy tables together.

12. The apparatus of claim 1 wherein the schema mapper defines the source of the partition key value to be a constant in a class of the object.

13. An apparatus comprising:
at least one processor;
a memory coupled to the at least one processor;
a computer program residing in the memory and being executed by the at least one processor, the computer program including a schema mapper for mapping between objects and relational database tables used to persist the objects, wherein each relational database table stores attributes for a class of objects with each row in each relational database table storing the attributes for one corresponding object in the class objects, wherein each row includes one or more primary key fields, the primary key fields storing a primary key that defines a unique identifier of corresponding object, the schema mapper further including:
a) a partitioning mechanism for defining the source of partitioning key values in an owning object and defining one or more partition key fields in the relational database table rows for the corresponding objects for storing the partition key values, the partitioning key values identifying a partition the corresponding object is assigned to, the partition defining a subclass of objects with the class, and wherein the partitioning key fields are defined to be a subset of the primary key fields such that the partition key value for the corresponding object at least partially defines the unique identifier of the corresponding object.

14. The apparatus of claim 13 wherein a schema mapping language is used by a developer to specify the source of the partitioning key value in the owning object and to specify the one or more partition key fields in the relational database table row of the corresponding object for storing the partition key value.

15. The apparatus of claim 13 wherein the schema mapper creates an entity owning extent object for each partition in the class, wherein each entity owning extent object corresponds to one partition in the class, and wherein each entity owning extent object stores a reference to each object in the corresponding partition.

16. The apparatus of claim 15 wherein each entity owning extent object facilitates partition specific queries of objects in the corresponding partition by insulating such queries from specific details of partitioning decisions and unique identity decisions.

17. The apparatus of claim 15 wherein the entity owning extent object includes mechanism for adding references to new objects when new objects are added to the corresponding partition.

18. The apparatus of claim 13 wherein the source of the partitioning key value comprises an exported key from the owning object.

19. The apparatus of claim 13 wherein the source of the partitioning key value comprises a constant defined in the class of the corresponding object.

20. The apparatus of claim 18 wherein the ex ported key comprises a portion of a primary key value for the owning object, the primary key value for the owning object defining a unique identifier of the owning object.

21. A program product comprising:
(A) a schema mapper for mapping between an object attributes and a fields in a database table, the schema mapper including a mechanism for defining a source of a partitioning key value and defining a partitioning key field in the database table for storing the partitioning key value, the partitioning key value identifying a partition containing the object; and
(B) signal bearing media bearing the schema mapper.

22. The program product of claim 21 wherein the signal bearing media comprises recordable media.

23. The program product of claim 21 wherein the signal bearing media comprises transmission media.

24. The program product of claim 21 wherein the schema mapper stores the partition key value in a portion of a primary key, and wherein the primary key defines a unique identifier of the object such that the partition key value is made part of the unique identifier of the object.

25. The program product of claim 21 wherein the database table stores the object attributes for a class of objects, and wherein each row in the database table stores the attributes for a corresponding one of the class of objects, and wherein each row includes a partition key value to divide the class objects into partitions.

26. The program product of claim 21 wherein the schema mapper defines the source of the partition key value to be an attribute in an owning object.

27. The program product of claim 21 wherein the schema mapper defines the source of the partition key value to be an automatically generated unique identifier used to partition according to a default schema.

28. The program product of claim 21 wherein the schema mapper creates an entity owning extent object corresponding to each partition, and wherein the entity owning extent stores a reference to each object in the corresponding partition.

29. The program product of claim 28 wherein the entity owning extent object for each partition facilitates the partition specific queries by insulating such queries from specific details of partitioning decisions and unique identity decisions.

30. The program product of claim 28 wherein each entity owning extent object include mechanism for adding new objects to its corresponding partition.

31. The program product of claim 28 wherein each entity owning extent object includes an iterator for retrieving objects from the entity owning extent.

32. The program product of claim 21 wherein a schema mapping language is used to by a developer to defining the source of a partitioning key value and defining the partitioning key field in the database table for storing the partitioning key value.

33. The program product of claim 21 wherein the objects are part of an object oriented framework for modeling a business process and wherein the relational tables are legacy tables and wherein the schema mapper provides a mechanism for linking the object oriented framework and the legacy tables together.

34. The program product of claim 21 wherein the schema mapper defines the source of the partition key value to be a constant in a class of the object.

35. A program product comprising:
   (A) a schema mapper for mapping between objects and relational database tables used to persist the objects, wherein each relational database table stores attributes for a class of objects with each row in each relational database table storing the attributes for one corresponding object in the class objects, wherein each row includes one or more primary key fields, the primary key fields storing a primary key that defines a unique identifier of corresponding object, the schema mapper further including:
      a) a partitioning mechanism for defining the source of partitioning key values in an owning object and defining one or more partition key fields in the relational database table rows for the corresponding objects for storing the partition key values, the partitioning key values identifying a partition the corresponding object is assigned to, and wherein the partitioning key fields are defined to be a subset of the primary key fields such that the partition key value for the corresponding object at least partially defines the unique identifier of the corresponding object;
   (B) signal bearing media bearing the schema mapper.

36. The program product of claim 35 wherein the signal bearing media comprises recordable media.

37. The program product of claim 35 wherein the signal bearing media comprises transmission media.

38. The program product of claim 35 wherein a schema mapping language is used by a developer to specify the source of the partitioning key value in the owning object and to specify the one or more partition key fields in the relational database table row of the corresponding object for storing the partition key value.

39. The program product of claim 35 wherein the schema mapper creates an entity owning extent object for each partition in the class, wherein each entity owning extent object corresponds to one partition in the class, and wherein each entity owning extent object stores a reference to each object in the corresponding partition.

40. The program product of claim 39 wherein each entity owning extent object facilitates partition specific queries of objects in the corresponding partition by insulating such queries from specific details of partitioning decisions and unique identity decisions.

41. The program product of claim 39 wherein the entity owning extent object includes a mechanism for adding references to new objects when new objects are added to the corresponding partition.

42. The program product of claim 35 wherein the source of the partitioning key value comprises an exported key from the owning object.

43. The program product of claim 35 wherein the source of the partitioning key value comprises a constant defined in the class of the corresponding object.

44. The program product of claim 42 wherein the exported key comprises a portion of a primary key value for the owning object, the primary key value for the owning object defining a unique identifier of the owning object.

45. A method for mapping between objects and a database table used to persistently store the objects, the method comprising the steps of:
   a) specifying a source for a partition key value, the partition key value identifying a partition corresponding objects are assigned to;
   b) specifying partitioning key fields in the database for storing the partition key values for the corresponding objects;
   c) storing the partition key value in the partition key field for the corresponding object.

46. The method of claim 45 wherein the source for a partition key value comprises an exported key from an owning object.

47. The method of claim 45 wherein the database table includes primary key fields storing primary key values, and wherein the primary key values define a unique identifier of the corresponding object, and wherein the step of storing specifying partitioning key fields comprises specifying a portion of the primary key fields to comprise partitioning key fields such that the primary key values include the partitioning key values.

48. The method of claim 45 wherein the steps of specifying a source for a partition key value and specifying partitioning key fields comprises uses a schema mapping language.

49. The method of claim 45 wherein the step of specifying a source for a partition key value comprises specifying an automatically generated unique identifier used to partition according to a default schema.

50. The method of claim 45 further comprising the step of creating an entity owning extent object for each partition, wherein the entity owning extent stores a reference to each object in the corresponding partition.

51. The method of claim 50 wherein the entity owing extent object for each partition facilitates partition specific queries by insulating such queries from specific details of partitioning decisions and unique identity decisions.

52. The method of claim 50 wherein the entity owing extent object includes an iterator for retrieving objects from the entity owing extent.

53. A method for mapping between objects and relational database tables used to persist the objects, wherein each relational database table stores attributes for a class of objects and with each row in each relational database table storing attributes for one corresponding object in the class objects, the method comprising the steps of:
   a) specifying one or more primary key fields in each row, each primary key field storing a primary key value that at least partially defines a unique identifier of the object corresponding to the row;

b) specifying a source of partition key values from a class of owning objects, the partition key values identifying a partition the corresponding object is assigned to; and c) defining one or more partition key fields in each row, each partition key fields storing the partition key values that identify the partition the corresponding object belongs is assigned to, wherein the partition key fields are defined to be subset of the primary key fields such that the partition key value for the corresponding object at least partially defines the unique identifier of the corresponding object.

54. The method of claim 53 wherein the steps of specifying one or more primary key fields and a source of partition key values comprises using a schema mapping language.

55. The method of claim 53 further comprising the step of creating an entity owning extent object for each partition in the class, wherein each entity owning extent object corresponds to one partition in the class, and wherein each entity owning extent object stores a reference to each object in the corresponding partition.

56. The method of claim 55 wherein each entity owning extent object facilitates partition specific queries of objects in the corresponding partition by insulating such queries from specific details of partitioning decisions and unique identity decisions.

57. The method of claim 55 wherein each entity owning extent includes a mechanism for adding references to new objects when new objects are added to the corresponding partition.

58. The method of claim 53 wherein the step of specifying a source of the partitioning key value comprises specifying an exported key from the owning object.

59. The method of claim 53 wherein the step of specifying a source of the partitioning key value comprises specifying a constant defined in the class of the corresponding object.

60. The method of claim 53 wherein the exported key comprises a portion of a primary key value for the owning object, the primary key value for the owning object defining at least a portion of a unique identifier of the owning object.

* * * * *